United States Patent
Xia et al.

(10) Patent No.: US 10,769,746 B2
(45) Date of Patent: Sep. 8, 2020

(54) DATA ALIGNMENT AND FORMATTING FOR GRAPHICS PROCESSING UNIT

(71) Applicant: Apple Inc., Cupertino, CA (US)

(72) Inventors: Liang Xia, Austin, TX (US); Robert D. Kenney, Austin, TX (US); Benjiman L. Goodman, Cedar Park, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 673 days.

(21) Appl. No.: 14/496,934

(22) Filed: Sep. 25, 2014

(65) Prior Publication Data

US 2016/0093014 A1    Mar. 31, 2016

(51) Int. Cl.
*G06T 1/20* (2006.01)
*G06T 1/60* (2006.01)
*G06F 9/00* (2006.01)

(52) U.S. Cl.
CPC .................. *G06T 1/20* (2013.01); *G06F 9/00* (2013.01); *G06T 1/60* (2013.01)

(58) Field of Classification Search
CPC ..................................... G06T 1/60; G06T 1/20
See application file for complete search history.

(56) References Cited

U.S. PATENT DOCUMENTS

| | | | |
|---|---|---|---|
| 5,999,200 A | 12/1999 | Harkin et al. | |
| 6,279,099 B1 | 8/2001 | Van Hook et al. | |
| 6,781,590 B2 | 8/2004 | Katsura et al. | |
| 8,379,039 B2 | 2/2013 | Greenebaum | |
| 2007/0185953 A1* | 8/2007 | Prokopenko | G06F 7/483 708/523 |
| 2014/0136778 A1* | 5/2014 | Khailany | G11C 7/18 711/114 |
| 2014/0176568 A1 | 6/2014 | Bastos et al. | |

\* cited by examiner

*Primary Examiner* — Matthew Salvucci
(74) *Attorney, Agent, or Firm* — Kowert, Hood, Munyon, Rankin & Goetzel, P.C.

(57) ABSTRACT

A data queuing and format apparatus is disclosed. A first selection circuit may be configured to selectively couple a first subset of data to a first plurality of data lines dependent upon control information, and a second selection circuit may be configured to selectively couple a second subset of data to a second plurality of data lines dependent upon the control information. A storage array may include multiple storage units, and each storage unit may be configured to receive data from one or more data lines of either the first or second plurality of data lines dependent upon the control information.

17 Claims, 9 Drawing Sheets

DATA ALIGNMENT AND FORMATTING FOR GRAPHICS PROCESSING UNIT

BACKGROUND

Technical Field

Embodiments described herein relate to computer processing and more specifically to register file access.

Description of the Related Art

Part of the operation of many computer systems, including portable digital devices such as mobile phones, notebook computers and the like, is the use of some type of display device, such as a liquid crystal display (LCD), to display images, video information/streams, and data. Accordingly, these systems typically incorporate functionality for generating images and data, including video information, which are subsequently output to the display device. Such devices typically include graphics processing units to process video and image information for subsequent display.

Graphics processing units (GPUs) typically operate on large amounts of graphics data in parallel using multiple execution pipelines or shaders. Modern GPUs are becoming more and more programmable, with less computation done in fixed-function hardware and more computation done using programmable shaders that execute graphics instructions from application developers. Execution of such instructions may consume considerable power, especially in more powerful GPUs.

SUMMARY OF THE EMBODIMENTS

Various embodiments of a unified shading cluster are disclosed. Broadly speaking, an apparatus and a method are contemplated in which a first selection circuit may be configured to selectively couple each data bit of a first subset of a plurality of data bits to a respective data line of a first plurality of data lines. A second selection circuit may be configured to selectively couple each data bit of a second subset of a plurality of data bits to a respective data line of a second plurality of data lines. A storage array may include a plurality of storage units, where each storage unit may be configured to selectively receive data from at least one data line of the first plurality of data lines or at least one data line of the second plurality of data lines In one embodiment, the first selection circuit may include a plurality of multiplex circuits. Each multiplex circuit may be configured to selectively couple a given data bit of the plurality of data bits to a respective data line of the first plurality of data lines.

In a further embodiment, the second selection circuit may include a plurality of multiplex circuits. Each multiplex circuit may be configured to selectively couple a given data bit of the plurality of data bits to a respective data line of the second plurality of data lines.

BRIEF DESCRIPTION OF THE DRAWINGS

The following detailed description makes reference to the accompanying drawings, which are now briefly described.

Figure 1:
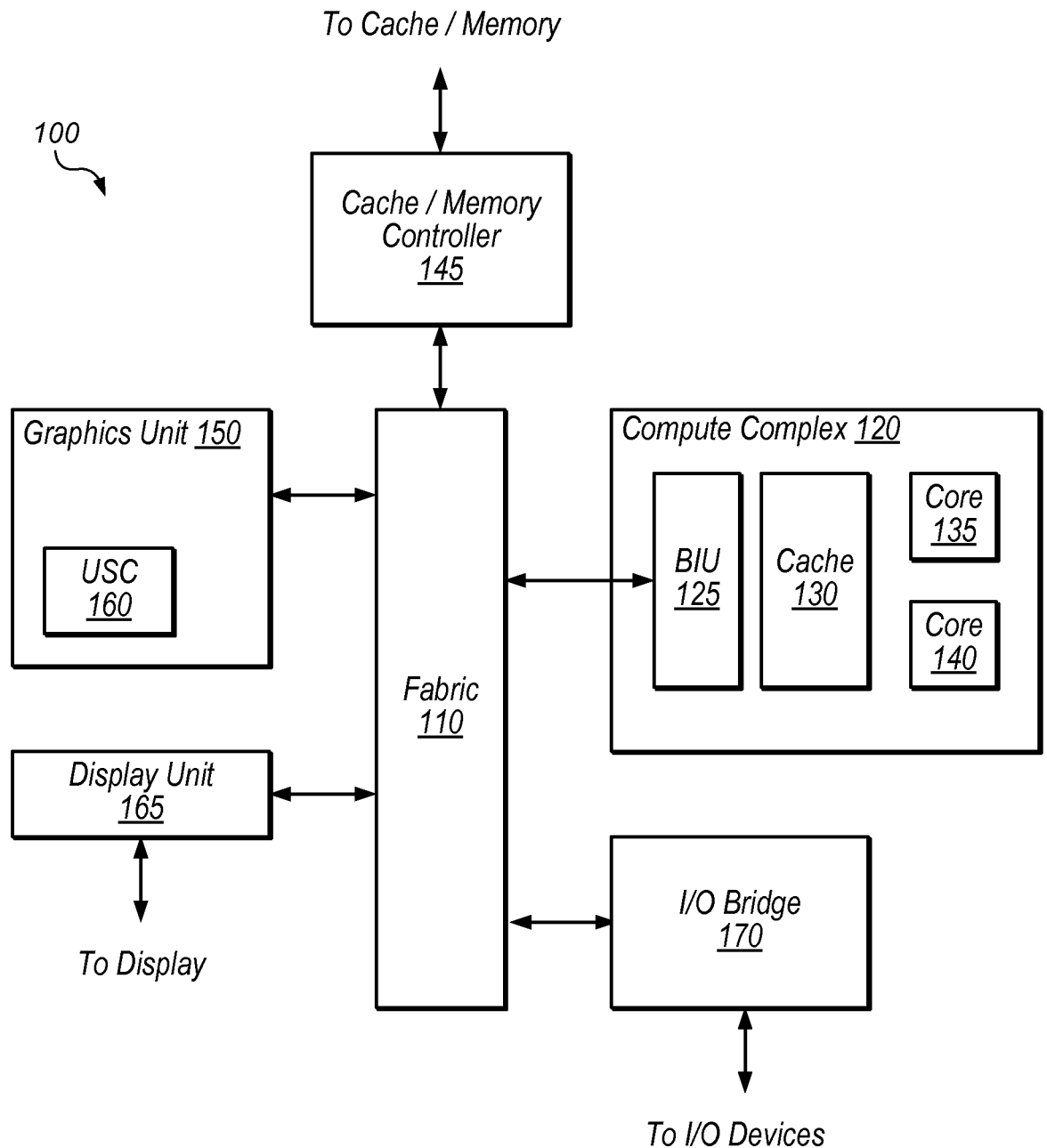
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Graphics Processing Units (GPUs) may include multiple registers that may be used in various computations performed by shading units, such as, a vertex shader, for example. A data execution pipeline may read source operands from the registers, perform an operation using the source operands, and the write computed results back to the registers. Many such operations may be performed in parallel.

During operation of GPUs, large amounts of data may be moved between registers specific to individual processing pipelines and local memory shared between the various processing pipelines. In some GPUs, multiple queue structures may be employed to store read data for a number of processing cycles before writing the data to a desired memory location. In order to avoid latency and conflict issues, the queue structures may need to be of sufficient size to avoid stalling a GPU. As queue size increases in response to performance and/or architectural needs, scaling issues may arise that may result in wire routing congestion during physical design of a queue structure.

Additionally, data received from the local memory may be to be transformed (also referred to herein as "reformatted") so that the incoming data may be properly directed to its destination. Such transformations may require a large number of multiplex circuits, further complicating the physical design of the queue structure. The embodiments illustrated in the drawing and described below may provide techniques for providing a queue structure that can be scaled while minimizing the impact on wire routing.

System Overview

Referring to FIG. 1, a block diagram illustrating an embodiment of a device 100 is shown. In some embodiments, elements of device 100 may be included within a system-on-a-chip (SoC). In some embodiments, device 100 may be included in a mobile device, which may be battery-powered. Therefore, power consumption by device 100 may be an important design consideration. In the illustrated embodiment, device 100 includes fabric 110, compute complex 120, input/output (I/O) bridge 170, cache/memory controller 145, graphics unit 150, and display unit 165.

Fabric 110 may include various interconnects, buses, multiplex circuits (commonly referred to as "MUX's"), controllers, etc., and may be configured to facilitate communication between various elements of device 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

In the illustrated embodiment, compute complex 120 includes bus interface unit (BIU) 125, cache 130, and cores 135 and 140. In various embodiments, compute complex 120 may include various numbers of cores and/or caches. For example, compute complex 120 may include 1, 2, or 4 processor cores, or any other suitable number. In one embodiment, cache 130 is a set associative L2 cache. In some embodiments, cores 135 and/or 140 may include internal instruction and/or data caches. In some embodiments, a coherency unit (not shown) in fabric 110, cache 130, or elsewhere in device 100 may be configured to maintain coherency between various caches of device 100. BIU 125 may be configured to manage communication between compute complex 120 and other elements of device 100. Processor cores such as cores 135 and 140 may be configured to execute instructions of a particular instruction set architecture (ISA) which may include operating system instructions and user application instructions.

Cache/memory controller 145 may be configured to manage transfer of data between fabric 110 and one or more caches and/or memories. For example, cache/memory controller 145 may be coupled to an L3 cache, which may in turn be coupled to a system memory. In other embodiments, cache/memory controller 145 may be directly coupled to a memory. In some embodiments, cache/memory controller 145 may include one or more internal caches.

As used herein, the term "coupled to" may indicate one or more connections between elements, and a coupling may include intervening elements. For example, in FIG. 1, graphics unit 150 may be described as "coupled to" a memory through fabric 110 and cache/memory controller 145. In contrast, in the illustrated embodiment of FIG. 1, graphics unit 150 is "directly coupled" to fabric 110 because there are no intervening elements.

Graphics unit 150 may include one or more processors and/or one or more graphics processing units (GPU's). Graphics unit 150 may receive graphics-oriented instructions, such OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes Unified Shading Cluster (USC) 160.

Display unit 165 may be configured to read data from a frame buffer and provide a stream of pixel values for display. Display unit 165 may be configured as a display pipeline in some embodiments. Additionally, display unit 165 may be configured to blend multiple frames to produce an output frame. Further, display unit 165 may include one or more interfaces (e.g., MIPI® or embedded display port (eDP)) for coupling to a user display (e.g., a touchscreen or an external display).

I/O bridge 170 may include various elements configured to implement: universal serial bus (USB) communications, security, audio, and/or low-power always-on functionality, for example. I/O bridge 170 may also include interfaces such as pulse-width modulation (PWM), general-purpose input/output (GPIO), serial peripheral interface (SPI), and/or inter-integrated circuit (I2C), for example. Various types of peripherals and devices may be coupled to device 100 via I/O bridge 170.

It is noted that the embodiment illustrated in FIG. 1 is merely an example. In other embodiments, different functional units (also referred to herein as "functional blocks"), and different configurations of functional blocks within device 100 are possible and contemplated.

Graphics Unit

Figure 2:
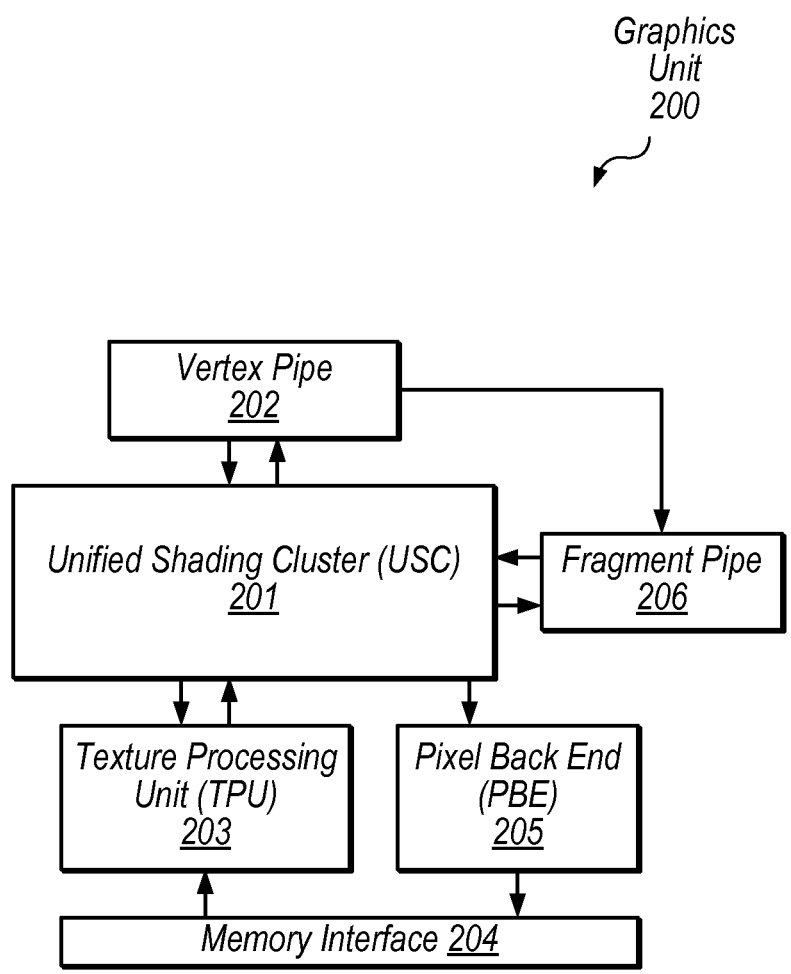
FIG. 2 illustrates an embodiment of a graphics unit.

Turning to FIG. 2, a simplified block diagram illustrating one embodiment of a graphics unit is shown. Graphics unit 200 may, in various embodiments, corresponding to graphics units 150 as depicted in FIG. 1. In the illustrated embodiment, graphics unit 200 includes unified shading cluster (USC) 201, vertex pipe 202, fragment pipe 206, texture processing unit (TPU) 203, pixel back end (PBE) 205, and memory interface 204. In one embodiment, graphics unit 200 may be configured to process both vertex and fragment data using USC 201, which may be configured to process graphics data in parallel using multiple execution pipelines or instances.

Vertex pipe 202, in the illustrated embodiment, may include various fixed-function hardware configured to process vertex data. Vertex pipe 202 may be configured to communicate with USC 201 in order to coordinate vertex processing. In the illustrated embodiment, vertex pipe 202 is configured to send processed data to fragment pipe 206 and/or USC 201 for further processing.

Fragment pipe 206, in the illustrated embodiment, may include various fixed-function hardware configured to process pixel data. Fragment pipe 206 may be configured to communicate with USC 201 in order to coordinate fragment processing. Fragment pipe 206 may be configured to perform rasterization on polygons from vertex pipe 202 and/or USC 201 to generate fragment data. Vertex pipe 202 and/or fragment pipe 206 may be coupled to memory interface 204 (coupling not shown) in order to access graphics data.

USC 201, in the illustrated embodiment, is configured to receive vertex data from vertex pipe 202 and fragment data from fragment pipe 206 and/or TPU 203. USC 201 may be configured to perform vertex processing tasks on vertex data which may include various transformations and/or adjustments of vertex data. USC 201, in the illustrated embodiment, may also be configured to perform fragment processing tasks on pixel data such as texturing and shading, for example. USC 201 may include multiple execution instances for processing data in parallel. USC 201 may be referred to as "unified" in the illustrated embodiment in the sense that it is configured to process both vertex and fragment data. In other embodiments, programmable shaders may be configured to process only vertex data or only fragment data.

TPU 203, in the illustrated embodiment, is configured to schedule fragment processing tasks from USC 201. In one embodiment, TPU 203 may be configured to pre-fetch texture data and assign initial colors to fragments for further processing by USC 201 (e.g., via memory interface 204). TPU 203 may be configured to provide fragment components in normalized integer formats or floating-point formats, for example. In one embodiment, TPU 203 may be configured to provide fragments in groups of four (a "fragment quad") in a 2×2 format to be processed by a group of four execution instances in USC 201.

PBE 205, in the illustrated embodiment, is configured to store processed tiles of an image and may perform final operations to a rendered image before it is transferred to a frame buffer (e.g., in a system memory via memory interface 204). Memory interface 204 may facilitate communications with one or more of various memory hierarchies in various embodiments.

In various embodiments, a programmable shader such as USC 201 may be coupled in any of various appropriate configurations to other programmable and/or fixed-function elements in a graphics unit. The exemplary embodiment of FIG. 2 shows one possible configuration of a graphics unit 200 for illustrative purposes.

Unified Shading Cluster

Figure 3:
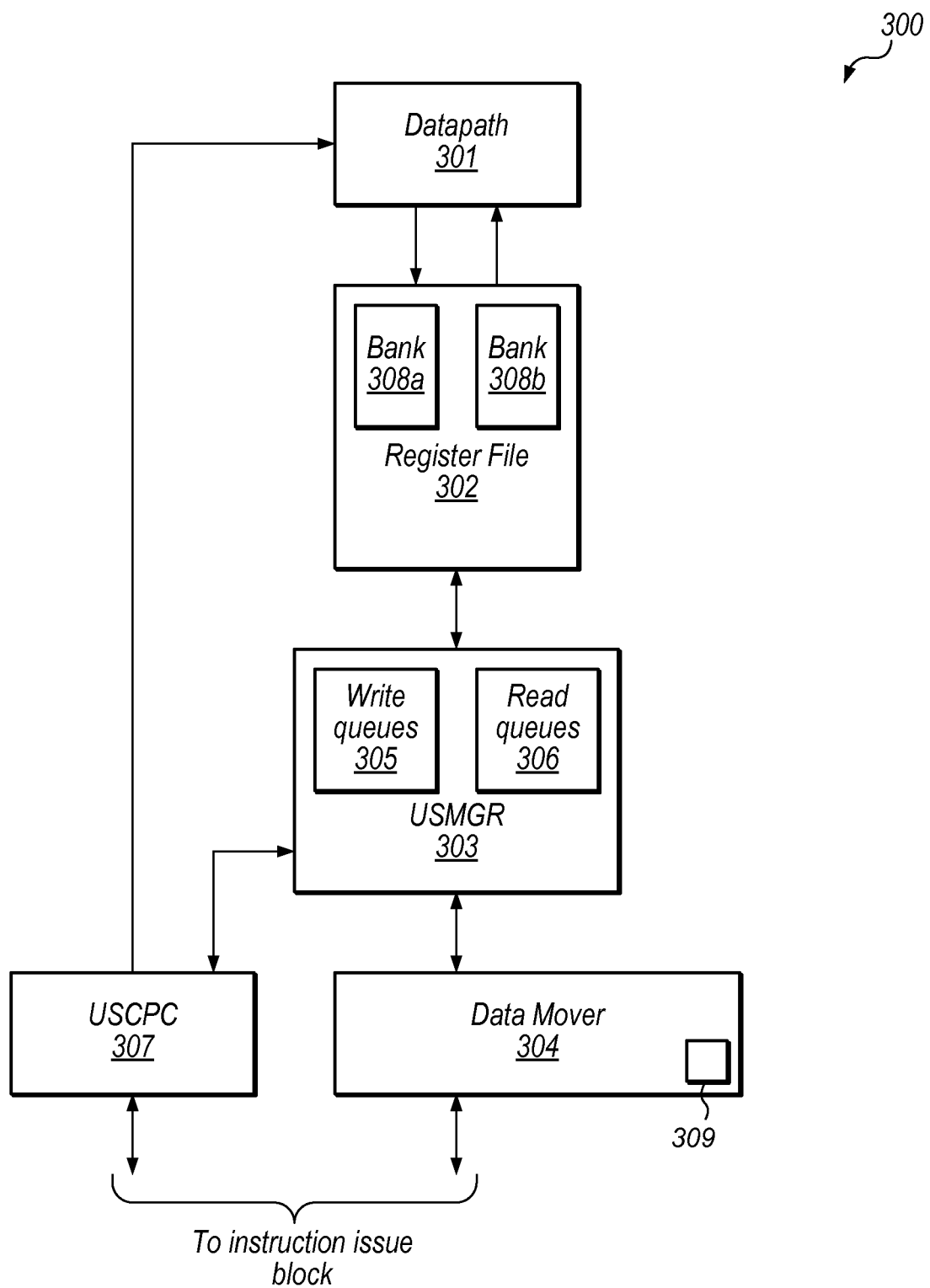
FIG. 3 illustrates an embodiment of a portion of a unified shading cluster.

An embodiment of a portion of a Unified Shading Cluster (USC) is illustrated in FIG. 3. It is noted, that for the purposes of clarity, some functional units have been omitted from USC 300. In various other embodiments, USC 300 may include additional functional units. USC 300 may, in various embodiments, correspond to USC 201 as illustrated in FIG. 2. The illustrated embodiment includes datapath 301, Register File 302, Unified Store Manager (USMGR) 303, Data Mover 304, and Unified Store Pipeline Controller (USCPC) 307.

Datapath 301 may include multiple logic circuits configured to perform operations on source operands retrieved from Register File 302. Upon completion of the operation, results may be written back into Register File 302. In various embodiments, multiple operations may be performed in parallel. In such cases, Datapath 301 may access data from different banks within Register File 302 in parallel.

Register File 302 may include multiple banks, such as, e.g., banks 308*a* and 308*b*. Although only two banks are depicted in the embodiment illustrated in FIG. 3, any suitable number of banks may be employed in other embodiments. Each bank may be operated independently, and may contain multiple data storage cells. In some embodiments the data storage cells may include both a read port and a write port allowing for parallel read and write access to a given data storage cell. In other embodiments, the data storage cells may include a single port through which a read or a write operation may be performed. It is noted that any suitable type of data storage cell may be employed. For example, in some embodiments, a Static Random Access Memory (SRAM) data storage cell may be employed.

During operation, Register File 302 may receive requests for read or write operations from both USMGR 303 as well as Datapath 301. In some embodiments, accesses, both read and write, from Datapath 301 may take priority over accesses from USMGR 303.

USMGR 303 includes write queues 305 and read queues 306 as well as additional control circuitry (not shown). In some embodiments, each write queue of write queues 305 may correspond to a respective bank of Register File 302, and each read queue may correspond to a respective bank of Register File 302. In other embodiments, each queue of write queues 305 and read queues 306 may store accesses for any bank of Register File 302. Writes queues 305 and read queues 306 may include multiple registers (one register per entry in the queue), with each register including multiple data storage cells coupled in parallel.

During operation, USMGR 303 may receive read and write requests from Data Mover 304. Each request may be targeted at a specific bank within Register File 302. As described below in more detail, write requests may include control bits which may indicate that a given write request is to be held, i.e., not written to Register File 302, in a write queue corresponding to the target bank in Register File 302. USMGR 303 may also send encoded information on the status of write queues 305 and read queues 306. Furthermore, USMGR 303 may also, in various embodiments, be configured to determine how often a given bank in Register File 302 is victimized, i.e., when USCPC accesses the given bank thereby preventing queue access to the given bank. As described in greater detail below, when a level of victimization meets or exceeds a threshold level, USMGR 303 may send a signal to USCPC 307 to hold further accesses, through Datapath 301, to a victimized bank in Register File 302.

Data Mover block 304 may include logic circuits and state machines collectively configured to receive and arbitrate requests from various agents within a graphics unit, such as, graphics unit 200 as illustrated in FIG. 2. For example, Data Mover block 304 may arbitrate requests from TPU 203 or PBE 205 as illustrated in FIG. 2. When arbitrate requests, Data Mover 304 may used queue status information received from USMGR 303 to select a next request to send to USMGR 303 for processing. Data Mover 304 may include control bits in write requests sent to USMGR 303 that indicate that data for a given write request may be needed shortly and should just be held in write queues 305.

Data mover 304 may, in some embodiments, include format unit 309. As described below in more detail, format unit 309 may, in various embodiments, be configured to receive data from a local memory and reformat or reorder the received data. Once the data has been reordered, it may be sent to USMGR 303 or other blocks within USC 300.

USCPC 307 may also include assorted logic circuits and state machines configured to control operation of datapath 301 dependent upon instructions received from an instruction issue block. For example, USCPC 307 may receive instructions from Vertex Pipe 202 or Fragment Pipe 206. USCPC 307 may receive one or more signals from USMGR 303 indicating that accesses, via datapath 301, to a particular bank of Register File 302 should be halted. In some cases, accesses may be halted for multiple processing cycles, while USMGR 303 processes requests pending in write queues 305 and read queues 306. Once USMGR 303 has determined the particular bank is no longer being victimized, USCPC 307 may resume allow datapath 301 to resume accesses to Register File 302.

It is noted that the embodiment illustrated in FIG. 3 is merely an example. In other embodiments, different functional blocks and different configurations of functional blocks are possible and contemplated.

Figure 4:
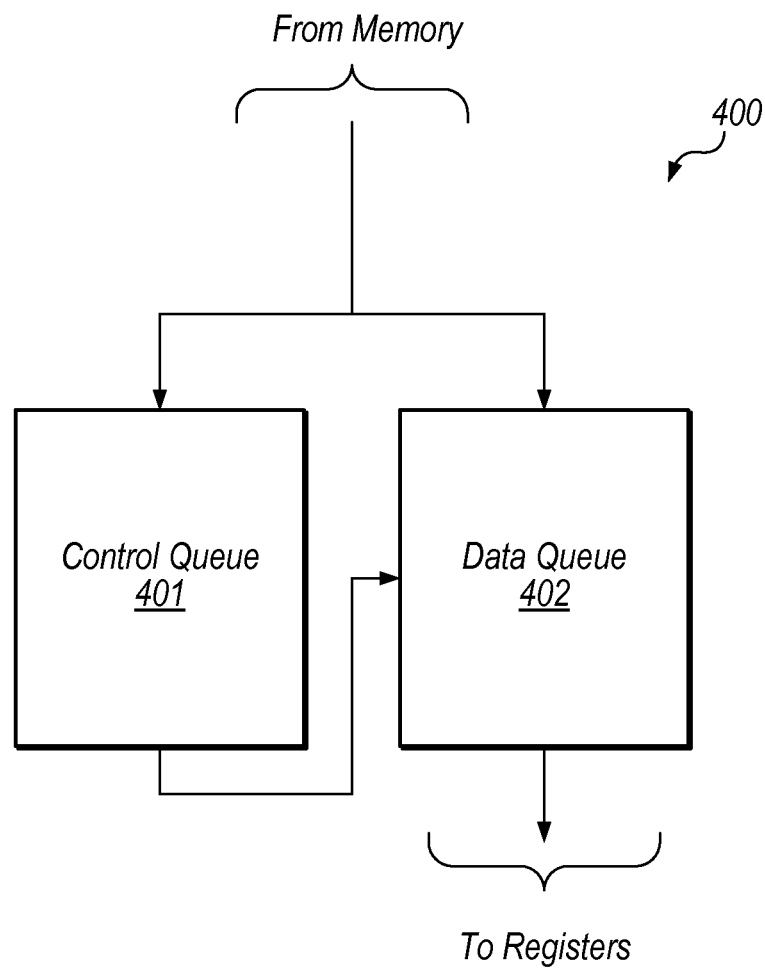
FIG. 4 illustrates an embodiment of a format unit.

Referring to FIG. 4, an embodiment of a format unit is illustrated. Format unit 400 may, in some embodiments, correspond to format unit 309 of USC 300 as illustrated in FIG. 3. In the illustrated embodiment, format unit 400 includes control queue 401 and data queue 402.

Information received from memory may include both control information and graphics data, such as, e.g., pixel data. The control information may include information regarding any permutation of received graphics data. Such information may be used to properly format, i.e., write received graphics data into correct locations within data queue 402. In various embodiments, control information may be stored in control queue 401, separately from received graphics data. Control queue 401 may be coupled to incoming read information. One or more entries may be allocated when a read is issued, and may be de-allocated when the data arrives at data queue 402. By storing control information separately from graphics data, control queue 401 may, in some embodiments, be scaled to handle read bandwidth requirements.

As described below in more detail, data queue 402 may be configured to receive incoming read data. Data queue 402 may include one or more selection circuits (also referred to herein as "alignment units") that select and route specific bits of data from the memory to appropriate locations within data queue 402. Once the data has stored, data queue 402 may send the data to an appropriate sub-block within a GPU, or any other suitable location.

Control queue 401 and data queue 402 may be designed in accordance with any one of various design styles. For example, in some embodiments, control queue 401 and data queue 402 may include multiple SRAM-style data storage cells. In other embodiments, control queue 401 and data queue 402 may include multiple registers or register files, each of which is configured to store a portion of data received from the memory.

It is noted that the embodiment illustrated in FIG. 4 is merely an example. In other embodiments, different numbers of queues and different arrangements of queues are possible and contemplated.

Figure 5:
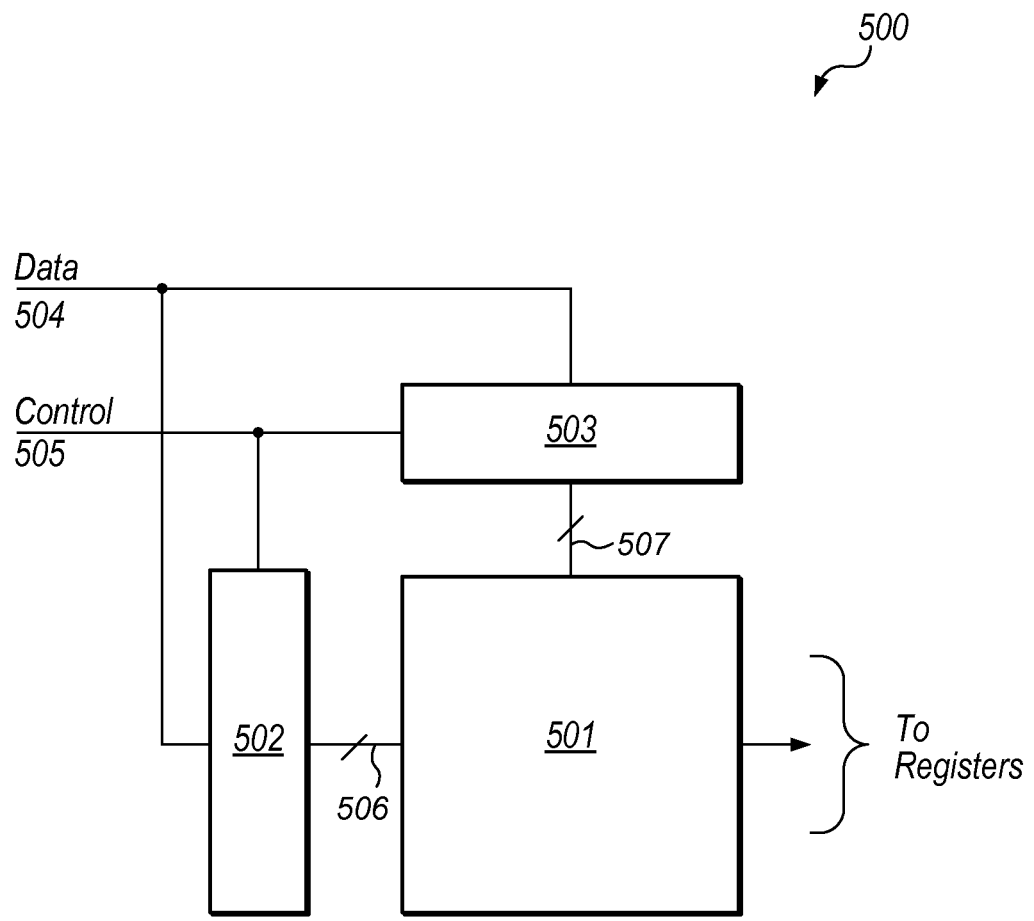
FIG. 5 illustrates an embodiment of a data queue of a format unit.

Turning to FIG. 5, an embodiment of a data queue is illustrated. In some embodiments, data queue 500 may correspond to data queue 402 of format unit 400 as illustrated in FIG. 4. In the illustrated embodiment, data queue 500 includes storage array 501, and alignment units (also referred to herein as "selection units") 503 and 502. Each of alignment units 503 and 502 are configured to receive data bus 504. In some embodiments, data received via data bus 504 may be from a memory shared between multiple processing units. Data bus 504 may include multiple data bits. For example, in some embodiments, data bus 504 may include 128 data bits, or any other suitable number of data bits.

Each of alignment units 503 and 502 may be configured to selectively couple a portion of data bus 504 to column data lines 507 and row data lines 506, respectively. In some embodiments, each of column lines 507 and row lines 506 may include less data bits than data bus 504. The selection of which data bits of data bus 504 are coupled to column lines 507 and row lines 506 may, in various embodiments, depend upon control signal 505. Although depicted as a single line, control signal 505 may include multiple data bits and may be encoded to reduce wiring overhead. Control signal 505 may, in some embodiments, be received from a control queue, such as, control queue 401 as illustrated in FIG. 4, for example.

Alignment units 503 and 502 may, in some embodiments, include one or more multiplex circuits, each of which is configured to select one data bit of data bus 504. In some embodiments, multiple multiplex circuits may be coupled in parallel to select ranges of data bits from data 504 to be coupled to either row lines 506 or row lines 507. Such multiplex circuits may be constructed in accordance with one of various design styles. For example, in some embodiments, the multiplex circuits may include a plurality of tri-state buffers whose outputs are coupled together in a wired-OR fashion, and whose control inputs are dependent upon one of the control signal 505. In other embodiments, the multiplex circuits may include a plurality of logic gates configured to implement the desired multiplex.

Storage array 501 may include multiple data storage cells, registers, register files, or any suitable storage circuit. In some embodiments, each storage circuit included within storage array 501 may be a single-port storage circuit, while, in other embodiments, each storage circuit may include separate read and write ports. As described below in more detail, each data storage circuit may include a selection circuit configured to select one or more data lines from either row lines 506 or column lines 506 in response to one or more data bits from control signal 505. Data stored in storage array 501 may be sent to various destinations, such as, e.g., registers within particular processing pipelines.

It is noted that the embodiment illustrated in FIG. 5 is merely an example. In other embodiments, different functional units and different configurations of functional units may be employed.

Figure 6:
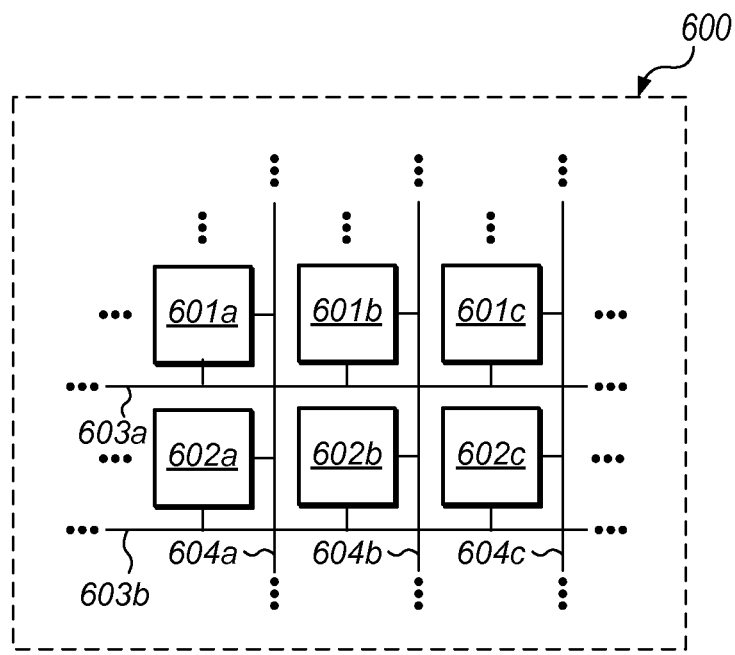
FIG. 6 illustrates an embodiment of a storage array of a data queue.

Referring to FIG. 6, an embodiment of a storage array is illustrated. In some embodiments, storage array 600 may correspond to storage array 501 as illustrated in the embodiment depicted in FIG. 5. In the illustrated embodiment, storage array 600 includes storage units 601a-c and storage units 602a-c. Storage unit 600 also includes row data lines 603a-b, and column data lines 604a-c, which may, in various embodiments, be coupled to alignment units such as, alignment units 502 and 503 as illustrated in FIG. 5, for example. It is noted that various control lines coupled to the individual storage units have been omitted for the sake of clarity.

Each storage units 601a-c and 602a-c is configured to receive data from either one or row data lines 603a-b or column data lines 604a-c. For example, storage unit 601a may receive data from either column data line 604a or row data line 603a. As described below, in more detail, each storage unit may include a multiplex circuit, or any other suitable selection circuit, configured to select one of the coupled row and column data lines. It is noted that although each row and column data lines are depicted as being a single line, in various embodiments, each of the illustrated row and column data lines may include multiple signal lines, each capable of carrying a single data bit. In such cases, each storage unit may include multiple storage circuits, each capable of storing a single data bit.

In various embodiments, the row data lines and the column data lines are orthogonal to each other in a physical design of storage array 600. For example, row data line 603a is orthogonal to column data lines 604a-c. The row data lines may, in some embodiments, be implemented on one metal layer of semiconductor manufacturing processing, while the column data lines may be implemented on another metal layer of the semiconductor manufacturing process.

During operation, data may be available on either row data lines 603a-b or column data lines 604a-c as determined by alignment units, such as alignment units 503 and 503 of FIG. 5, for example. Individual storage units may select data on its associated row or column data line for storage, thereby allowing data from various bit positions within data originally received by a format unit, to be selectively stored in different relative positions within storage array 600. In some embodiments, data stored in each storage unit may be designated for a particular destination. For example, data stored in storage unit 601a may be designated to be sent to a register of an instance of a processing pipeline within a GPU, while data stored in storage unit 601b may be designated to be sent to a register in another instance of a processing pipeline with the GPU. By storing data in such a fashion, received data may be reordered or realigned to conform the a data format employed by a particular destination.

It is noted that the embodiment illustrated in FIG. 6 is merely an example. In other embodiments different numbers of storage units, and different configurations of storage units are possible and contemplated.

Figure 7:
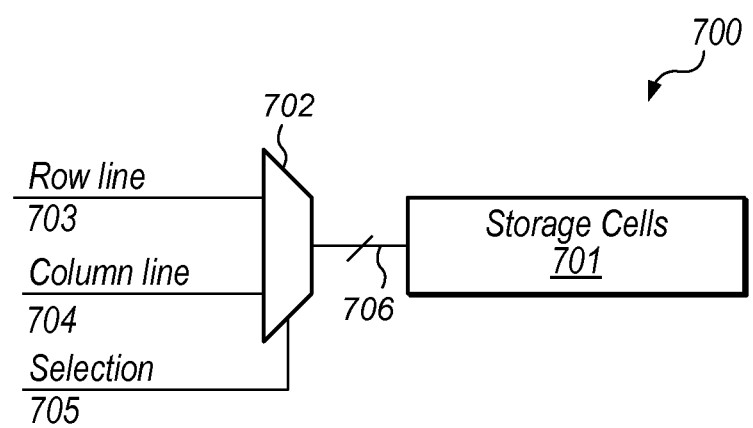
FIG. 7 illustrates an embodiment of a storage unit of a storage array.

Turning to FIG. 7, an embodiment of a storage unit is illustrated. In some embodiments, storage unit 700 may correspond to any or all of storage units 601a-c and 602a-c as illustrated in FIG. 6. In the illustrated embodiment, storage unit 700 includes storage cells 701 and multiplex circuit 702.

Storage cells 701 may include multiple data storage circuits, each capable of storing a particular data bit. Although illustrated as a single unit, storage circuits 701 may, in various embodiments, include any suitable number of storage circuits. In such cases, multiplex output 706 may include multiple data lines, each of which may be coupled to a respective storage circuit of storage circuits 701.

Multiplex circuit 702 may, in various embodiments, be configured to selectively couple either row line (also referred to herein as "row data line") 703 or column line (also referred to herein as "column data line") 704 to multiplex output 706 dependent upon a value of selection signal 705. It is noted that although row line 703 and column line 704 are depicted as being a single data bit, in various embodiments, row line 703 and column lien 704 may include any suitable number of data bits. Such data bits may be a subset of row lines 506 or columns lines 507 as illustrated in FIG. 5.

In various embodiments, selection signal 705 may be received from a control queue such as, e.g., control queue 401 as illustrated in FIG. 4. Selection signal 705 may, in various embodiments, be the result of decoding control information received from the control queue. In other embodiments, control information may be decoded prior to storage in the control queue.

Storage cells 701 may include any suitable number of storage circuits. Such storage circuits may include a SRAM storage cell, a Dynamic RAM storage cell, a latch, a flip-flop circuit, or any other suitable storage circuit. In various embodiments, each storage circuit included in storage cells 701 may be read from or written to in parallel.

The embodiment illustrated in FIG. 7 is merely an example. Different types of storage cells and multiplex circuits may be employed in various other embodiments.

Figure 8:
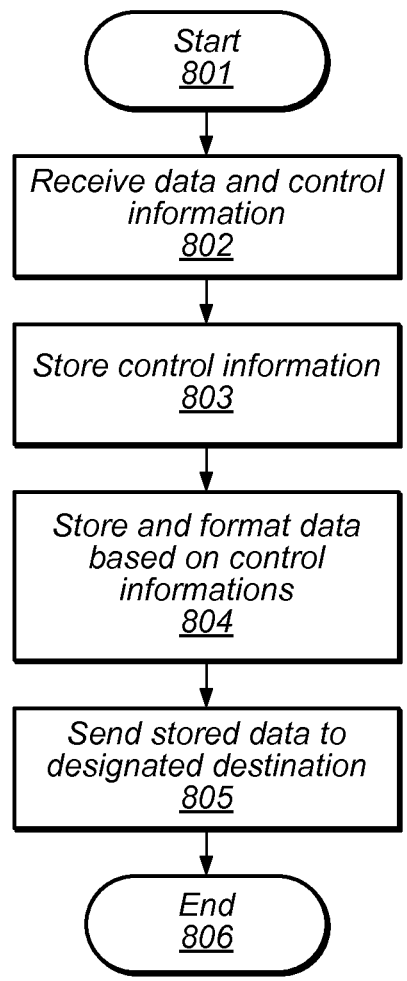
FIG. 8 depicts a flow diagram illustrating an embodiment of a method for operating a format unit.

Referring to FIG. 8, a flow diagram depicting an embodiment of a method for operating a format unit is illustrated.

Referring collectively to the embodiment illustrated in FIG. 4, and the flow diagram of FIG. 8, the method begins in block 801.

Control information and data may then be received (block 802). In various embodiments, the control information and data may be received from a local memory shared between different processing pipelines within a GPU. The control information may, in some embodiments, include information indicative of a destination for one or more portions of the received data. As described below, in more detail, the received data may need to be realigned (or "reformatted") in order to match an alignment for a particular destination as indicated by the control information. It is noted that in some embodiments, the control information, for a given portion of data, may arrive prior to the data, while, in other embodiment, data and its accompanying control information may arrive together at format unit 400.

The received control information may then be stored in control queue 401 (block 803). In various embodiments, the control information may be stored directly into control queue 401. In other embodiments, the control information may be decoded, or otherwise processed, prior to storage. By storing the control information separately, a size of control queue 401 may be varied independently of a size of data queue 402 to accommodate changes in read bandwidth for a given GPU design.

The received data may then be formatted and stored in data queue 402 (block 804). As described below, in more detail, in regard to FIG. 9, a portion of the data may be sent to either row data lines or column data lines within data queue 402 dependent upon control information received from control queue 401 corresponding to the data being stored. Data storage units within data queue 402 may then select to receive data from either a row data line or column data line dependent upon the corresponding control information. By storing data in this fashion, the received data may be aligned (or "formatted") to match an alignment of an intended recipient. For example, received data may be stored into multiple columns within a given row. Alternatively, the received data may be stored across multiple rows within a single column.

Once the data has been stored in data queue 402, the data may be sent to its designated destination (block 805). In various embodiments, the destinations may include a register, or other suitable memory, within a particular processing pipeline within a GPU. In some embodiments, the stored data may be held in data queue 402 until the intended destination is ready to receive the data. The method may then conclude in block 806.

It is noted that the embodiment of the method illustrated in FIG. 8 is merely an example. In other embodiments, different operations, and different orders of operations may be employed.

Figure 9:
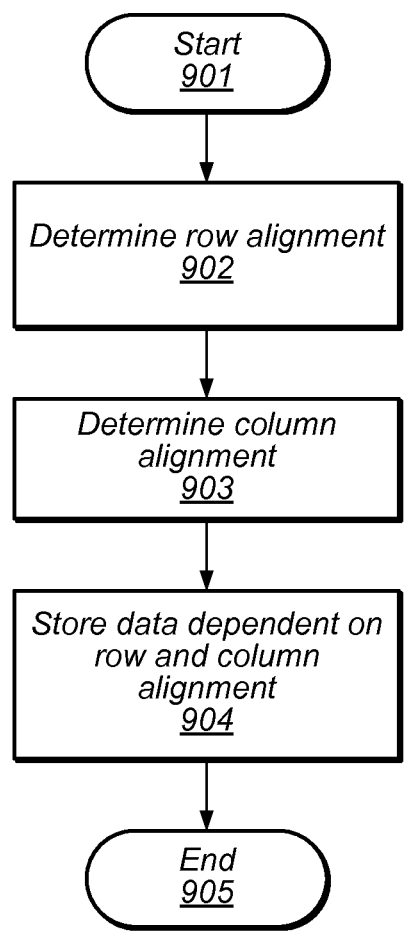
FIG. 9 depicts a flow diagram illustrating an embodiment a method formatting data.

Turning to FIG. 9, a flow diagram depicting an embodiment of a method for formatting data is illustrated. In various embodiments, the method illustrated in FIG. 9 may correspond to the operation depicted in block 804 of the flow diagram illustrated in FIG. 8. Referring collectively to the embodiment illustrated in FIG. 5 and the flow diagram of FIG. 9, the method begins in block 901.

A row alignment may then be determined (block 902). In various embodiments, row alignment unit 502 may select a subset of data bits from data bus 504. The selection may, in some embodiments, be dependent upon control signal 505, which may, in other embodiments, be received from a control queue, such as, control queue 401 as illustrated in the embodiment of FIG. 4. The selected subset of data bits may then be coupled onto row data lines 506.

A column alignment may then be determined (block 903). In various embodiments, column alignment unit 503 may select a subset of data bits from data bus 504. The selection may, in some embodiments, be dependent upon control signal 505, which may, in other embodiments, be received from a control queue, such as, control queue 401 as illustrated in the embodiment of FIG. 4. The selected subset of data bits may then be coupled onto column data lines 507. It is noted that in some embodiments, either a row alignment, or a column alignment may be performed, while, in other embodiments, both a row and column alignment may be performed using different subsets of data bits from data bus 504.

Once an alignment has been determined (either a row alignment, or a column alignment, or a combination, thereof), the alignment (or "formatted") data may be stored in storage array 501 (block 904). As described above in regard to FIG. 6, storage array 501 may include multiple storage units, and, in some embodiments, data may only be stored in a subset of the storage units. Each storage unit may be configured to receive one or more data bits from either row data lines 506 or column data lines 507 dependent upon information encoded in control signal 505. During a storage process, a given storage unit may store data received from either row data lines or column data lines. By allowing each storage unit to receive data in this fashion, routing congestion during physical design of format unit may be reduced in various embodiments. Once data is stored in the designated storage cells, the method may conclude in block 905.

Although the operations illustrated in FIG. 9 are depicted as being performed in a serial fashion, in other embodiments, one or more of the operations may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a first selection circuit configured to selectively couple data bits of a first subset of a plurality of data bits conveyed on a bus to respective data lines of a first plurality of data lines, the first plurality of data lines being column data lines;
a second selection circuit configured to selectively couple data bits of a second subset of the plurality of data bits conveyed on the bus to a respective data line of a second plurality of data lines, the second plurality of data lines being row data lines;
a first storage array including a plurality of storage units, wherein each storage unit of the plurality of storage units is configured to selectively receive data from at least one data line of the first plurality of data lines or at least one data line of the second plurality of data lines such that various bit positions of the data bits of the first and second subsets are selectively stored in different relative positions within the first storage array; and
a second storage array configured to store control information separately from data stored in the first storage array, wherein the first and second selection circuits are coupled to receive control information from the second storage array;
wherein each of the first and second selection circuits is configured to store data to conform to a data format employed by a destination of the data.

2. The apparatus of claim 1, wherein the first selection circuit includes a plurality of multiplex circuits, wherein each multiplex circuit is configured to selectively couple a given data bit of the plurality of data bits to a respective data line of the first plurality of data lines.

3. The apparatus of claim 1, wherein the second selection circuits includes a plurality of multiplex circuits, wherein each multiplex circuit is configured to selectively coupled a given data bit of the plurality of data bits to a respective data line of the second plurality of data lines.

4. The apparatus of claim 1, wherein each storage unit of the plurality of storage units includes one or more multiplex circuits, wherein each multiplex circuit is configured to receive data from a given data line of the first plurality of data lines or a given data line of a second plurality of data lines.

5. The apparatus of claim 1, wherein the first selection circuit is configured to selectively couple the data bits of the first subset of the plurality of data bits to the respective data lines of a first plurality of data lines dependent upon at least a first portion of the control information, and wherein the second selection circuit is configured to selectively couple the data bits of the second subset of the plurality of data bits to the respective data lines of the second plurality of data lines dependent upon at least a second portion of the control information.

6. A method, comprising:
receiving control information and data from a memory, wherein the data includes a plurality of data bits;
storing the control information in a first queue;
providing the control information to selection circuits;
selecting, using the selection circuits, a subset of the plurality of data bits dependent upon a portion of the control information, wherein selecting includes a first selection circuit selectively coupling data bits of a first subset of the plurality of data bits from a bus to column data lines in a second queue and a second selection circuit selectively coupling a second subset of the plurality of data bits from the bus to row data lines in the second queue, such that various bit positions of the data bits of the first and second subsets are selectively stored in different relative positions within the second queue; and
storing the subset of the plurality of data bits into the second queue, the second queue being separate from the first queue, wherein storing the subset of the plurality of data bits further comprise storing the plurality of data bits to conform to a data format employed by a destination of the plurality of data bits.

7. The method of claim 6, wherein the second queue includes a plurality of data storage units, wherein each data storage unit is coupled to at least one data line of a first plurality of data lines, and at least one data line of a second plurality of data lines.

8. The method of claim 7, wherein a given data line of the first plurality of data lines is orthogonal to a respective data line of the second plurality of data lines.

9. The method of claim 7, wherein storing the subset of the plurality of data bits comprises storing one or more data bits of the subset of the plurality of data bits in a given one of the plurality of data storage units.

10. The method of claim 9, wherein storing the one or more data bits of the subset of the plurality of data bits in the given one of the plurality of data storage units comprises selectively receiving data from either the at least one data line of the first plurality of data lines or the at least one data line of the second plurality of data lines.

11. The method of claim 6, wherein storing the control information comprises decoding the control information.

12. The method of claim 6, further comprising sending at least a portion of the stored subset of the plurality of data bits to at least one register.

13. A system, comprising:
a memory; and
a graphics unit including a first functional unit and a second functional unit, wherein the graphics unit is configured to:
receive control information and data from the memory, the data including a plurality of data bits;
store the control information in a first queue;
provide the control information to selection circuits;
select, using the selection circuits, a portion of the data dependent upon a portion of the control information provided from a first queue; and
store the portion of the data in a second queue separate from the first queue, wherein the second queue includes a plurality of storage units, and wherein each storage unit of the plurality of storage units is coupled to at least one data line of a first plurality of data lines and at least one data line of a second plurality of data lines, the first plurality of data lines being column data lines and the second plurality of data lines being row data lines;
wherein selecting a portion of the data includes a first one of the selection circuits selectively coupling data bits of a first subset of the plurality of data bits from a bus to column data lines in the second queue and a second selection circuit selectively coupling a second subset of the plurality of data bits from the bus to row data lines in the second queue such that various bit positions of the data bits of the portion are selectively stored in different relative positions within the second queue; and
wherein storing the portion of the data includes storing the data in a data format conforming to a destination of the portion of data.

14. The system of claim 13, wherein to store the portion of the data in the second queue, the graphics unit is further configured to store the portion of the data into a subset of a plurality of storage units in the second queue dependent upon the control information.

15. The system of claim 13, wherein the portion of the data includes a plurality of data bits, and wherein to store the portion of the data in the second queue, the graphics unit is further configured to store a subset of the plurality of data bits into a given one of a plurality of storage unit in the second queue.

16. The system of claim 15, wherein to store the subset of the plurality of data bits into the given one of the plurality of storage units in the second queue, the graphics unit is further configured to couple the given one of the plurality of storage units to at least one data line of the first plurality of data lines.

17. The system of claim 13, wherein each data line of the first plurality of data lines is orthogonal to a respective data line of the second plurality of data lines.

* * * * *